(12) United States Patent
Kleinatland

(10) Patent No.: US 10,071,667 B2
(45) Date of Patent: Sep. 11, 2018

(54) WINCH SYSTEM AND METHOD

(71) Applicant: Arthur Leslie Kleinatland, Cantonment, FL (US)

(72) Inventor: Arthur Leslie Kleinatland, Cantonment, FL (US)

( * ) Notice: Subject to any disclaimer, the term of this patent is extended or adjusted under 35 U.S.C. 154(b) by 702 days.

(21) Appl. No.: 14/594,088

(22) Filed: Feb. 2, 2015

(65) Prior Publication Data

US 2016/0221807 A1    Aug. 4, 2016

(51) Int. Cl.
*B60P 1/00*   (2006.01)
*B66D 1/12*   (2006.01)
*B66D 1/36*   (2006.01)
*B66D 1/00*   (2006.01)

(52) U.S. Cl.
CPC ............. *B60P 1/00* (2013.01); *B66D 1/00* (2013.01); *B66D 1/12* (2013.01); *B66D 1/36* (2013.01)

(58) Field of Classification Search
CPC .......... B66C 23/44; B60P 1/00; B60P 1/6454; B60P 3/1066; B60P 1/64; B66D 1/00; B66D 1/12; B66D 1/36; B66D 1/28; B66D 1/60; B66D 3/006; B60D 1/185
See application file for complete search history.

(56) References Cited

U.S. PATENT DOCUMENTS

| 1,533,419 | A | * | 4/1925 | Hug | .......................... | B60P 1/26 |
| | | | | | | 296/56 |
| 5,002,324 | A | * | 3/1991 | Griffin | ...................... | B60P 3/42 |
| | | | | | | 224/405 |
| 5,988,472 | A | * | 11/1999 | McPhail | ................... | B60R 9/00 |
| | | | | | | 224/403 |
| 2005/0191142 | A1 | * | 9/2005 | Rozell | ................... | B60P 1/6454 |
| | | | | | | 410/2 |
| 2013/0181023 | A1 | * | 7/2013 | Shawanda | ................. | B60R 9/06 |
| | | | | | | 224/403 |

\* cited by examiner

*Primary Examiner* — Sang K Kim
*Assistant Examiner* — Nathaniel L Adams
(74) *Attorney, Agent, or Firm* — J. Nevin Shaffer, Jr.

(57) ABSTRACT

A winch system and method includes a mount plate with a length and a width where the length of the mount plate includes a top, front and back and where the width of the mount plate is generally uniform and smaller at opposite ends and wider in between the opposite ends such that a support platform is provided and where the front and back of the length are conformed to fit over and attach with a bed rail in a vehicle. A winch assembly is connected with the mount plate at the support platform. A power source is connected with the winch assembly and a controller is connected with the winch assembly and the power source such that power to the winch assembly is controlled by operation of the controller.

20 Claims, 4 Drawing Sheets

WINCH SYSTEM AND METHOD

CROSS REFERENCE TO RELATED APPLICATION

This application claims the benefit of previously filed U.S. provisional patent application No. 61/925,917 filed Jan. 10, 2014 for a "UTV Bed Rail Mounted Plate Winch System and Method". The Applicant hereby claims the benefit of this provisional application under 35 U.S.C. § 119. The entire content of this provisional application is incorporated herein by this reference.

FIELD OF THE INVENTION

This invention relates to a winch system and method. In particular, in accordance with one embodiment, the invention relates to a winch system including a mount plate with a length and a width where the length of the mount plate includes a top, front and back and where the width of the mount plate is generally uniform and smaller at opposite ends and wider in between the opposite ends such that a support platform is provided and where the front and back of the length are conformed to fit over and attach with a bed rail in a vehicle. A winch assembly is connected with the mount plate at the support platform. A power source is connected with the winch assembly and a controller is connected with the winch assembly and the power source such that power to the winch assembly is controlled by operation of the controller.

BACKGROUND OF THE INVENTION

A problem exists with regard to the loading and transportation of heavy items by vehicles. In particular, for example only and not by way of limitation, Utility Terrain Vehicles (UTV) are widely used to transport individuals and materials to remote locations and around difficult terrain. The problem Applicant has identified is the problem of loading large, bulky, heavy objects by an individual or multiple individuals on to a vehicle. UTV's, for example, are commonly used for transporting payloads in the rear and loading of objects on to and off of the elevated bed of the UTV is a difficult task that subjects the individual or individuals to risk of injury.

Thus, there is a need in the art for a winch system and method that enables an individual to convert an ordinary vehicle into a vehicle that allows an individual or individuals to easily load and unload heavy objects onto and off of the vehicle in a controlled manner without risk of injury due to lifting and maneuvering heavy objects.

It therefore is an object of this invention to provide a winch system adapted for use with vehicles of all sorts including for example UTVs that is removably attachable to the UTV and provides for powered maneuvering of objects without risk of lifting injury to the user. Further it is an object of this invention to provide a winch system that evenly distributes the strain of maneuvering objects along the existing structure of the vehicle that is most able to endure the strain.

SUMMARY OF THE INVENTION

Accordingly, the winch system and method of the present invention, according to one embodiment, includes a mount plate with a length and a width where the length of the mount plate includes a top, front and back and where the width of the mount plate is generally uniform and smaller at opposite ends and wider in between the opposite ends such that a support platform is provided and where the front and back of the length are conformed to fit over and attach with a bed rail in a vehicle. A winch assembly is connected with the mount plate at the support platform. A power source is connected with the winch assembly and a controller is connected with the winch assembly and the power source such that power to the winch assembly is controlled by operation of the controller.

All terms used herein are given their common meaning so that "winch assembly" as used herein identifies and describes winches and the associated elements of winches, such as a motor and reel, etc., now known or hereafter developed for operating to pay out and reel in a cable powered or otherwise, for example only. Likewise, "power source" identifies a common element as known in the art for providing a source of electrical or mechanical power, such as a battery or hand crank, etc., and is not described more fully hereafter. Further, "controller" identifies any device designed to assist in the operation of the winch assembly through the power source such as a hard wired starter or a remotely operable wireless device.

According to one aspect of the invention, the winch assembly includes a cable with a first end connected with the winch assembly and a second end, where the second end is unattached and includes a connector. In another aspect, the invention further includes a cable guide where the cable is contained within the cable guide so as to control movement of the cable within the limits of the cable guide.

In one aspect, the system further includes a locking lip on the back of the mount plate where the locking lip is conformed to fit into the bed rail of the vehicle and lock the mounting plate in place over the bed rail.

In a further aspect, the controller is wirelessly operable. In another aspect, the invention further includes a holder connected with the mount plate and in another aspect the holder is conformed to connect with an independent device.

In another aspect, the system further includes a bed stop with a length and a first end and a second end where in a vehicle with a tilting bed the bed stop first end is connected to the tilting bed and the bed stop second end is connected to the vehicle such that the tilting bed is prevented from tilting past the length of the bed stop.

In one aspect, the power source is selected from a group consisting of: a battery connected with the vehicle and an independent battery. In another aspect, the vehicle is a UTV with a forward bed rail and the mount plate fits over the forward bed rail and is attached to the UTV at the forward bed rail.

According to another embodiment of the invention, in an UTV with a forward bed rail and two side rails, a winch system consists of a U-shaped mount plate with a length and a width where the length of the mount plate includes a top, front and back where the front and back form the legs of the U and where the width of the top of the U-shaped mount plate is generally uniform and smaller at opposite ends and wider in between the opposite ends such that a support platform is provided and where the U-shaped mount plate front and back of the length are conformed to fit over and attach with the UTV forward bed rail along the length and further where at the opposite ends the front legs include a cut out such that the back leg and top of the mount plate capture the back and top of the two side rails of the UTV. A winch assembly is connected with the U-shaped mount plate at the support platform where the winch assembly includes a motor and a cable with a first end connected with the winch assembly and a second end, where the second end is unattached and includes a connector conformed to removably connect with an independent item. A power source is connected with the winch assembly motor. A controller is connected with the winch assembly and the power source such that power to the winch assembly is controlled by operation of the controller; and a cable guide where the cable guide is attached to the support platform in front of the winch assembly and where the cable guide includes at least a top and two guide posts such that the cable is captured between the top and two guide posts and the two guide posts limit movement of the cable from side to side between the guide posts.

In one aspect, the U-shaped mount plate support platform has a top and a back but no front leg and an extended section that extends out beyond the forward bed rail and the cable guide is attached to the support platform at said extended section.

In another aspect, the controller is wirelessly operable. In one aspect, the invention further includes a holder connected with the U-shaped mount plate and in one aspect the holder is conformed to connect with an independent device.

In one aspect, the system further includes a locking lip on the back of the mount plate where the locking lip is conformed to fit into the bed rail of the vehicle and lock the mounting plate in place over the bed rail.

In another aspect, the system further includes a bed stop with a length and a first end and a second end where in a UTV vehicle with a tilting bed the bed stop first end is connected to the tilting bed and the bed stop second end is connected to the UTV vehicle such that the tilting bed is prevented from tilting past the length of the bed stop.

According to another embodiment, in an UTV with a forward bed rail and two side rails, a winch method consists of:

a. providing a U-shaped mount plate with a length and a width where the length of the mount plate includes a top, front and back where the front and back form the legs of the U and where the width of the U-shaped mount plate is generally uniform and smaller at opposite ends and wider in between the opposite ends such that a support platform is provided and where the U-shaped mount plate front and back of the length is conformed to fit over and attach with the UTV forward bed rail along the length and further where at the opposite ends the front legs include a cut out such that the back leg and top of the mount plate capture the back and top of the two side rails of the UTV; a winch assembly connected with the U-shaped mount plate at the support platform where the winch assembly includes a motor and a cable with a first end connected with the winch assembly and a second end, where the second end is unattached and includes a connector conformed to removably connect with an independent item; a power source connected with the winch assembly motor; a controller connected with the winch assembly and the power source such that power to the winch assembly is controlled by operation of the controller; and a cable guide where the cable guide is attached to the support platform in front of the winch assembly and where the cable guide includes at least a top and two guide posts such that the cable is captured between the top and two guide posts and the two guide posts limit movement of the cable from side to side between the guide posts; and b. operating the controller to provide power to the winch motor.

In another aspect, where upon operation of the winch motor the cable connector is extended and attached to the independent item.

In another aspect, the independent item is located outside of the UTV.

In a further aspect, where upon continued operation of the winch motor the independent item is drawn toward the forward bed rail and onto the UTV.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
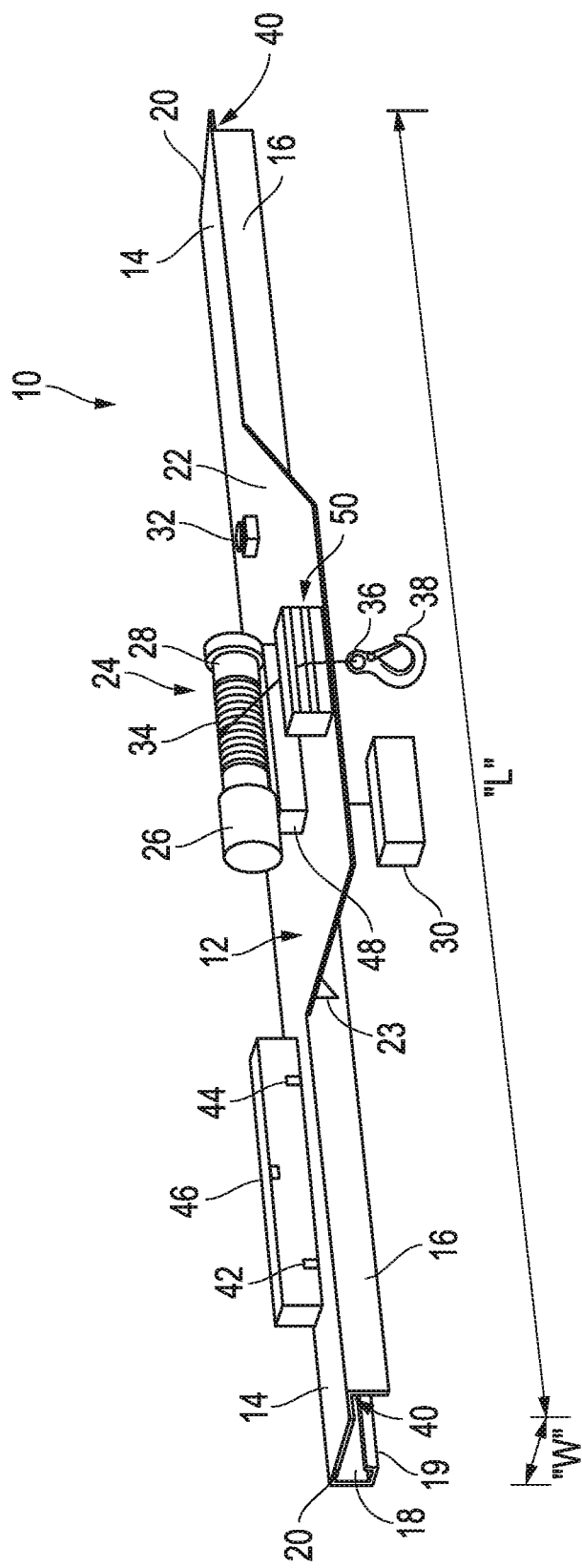
FIG. 1 is a perspective view flow chart of the winch system according to one embodiment.

A preferred embodiment of the present invention is illustrated by way of example in FIGS. 1-4. With specific reference to FIGS. 1 and 2, winch system 10 includes a mount plate 12 with a length "L" and a width "W". Mount plate 12 has a top 14, front 16 and back 18. As illustrated, the width "W" of the mount plate 12 is generally uniform and smaller at opposite ends 20 and wider in between the opposite ends 20 such that a support platform 22 is provided in the approximate middle.

Figure 3:
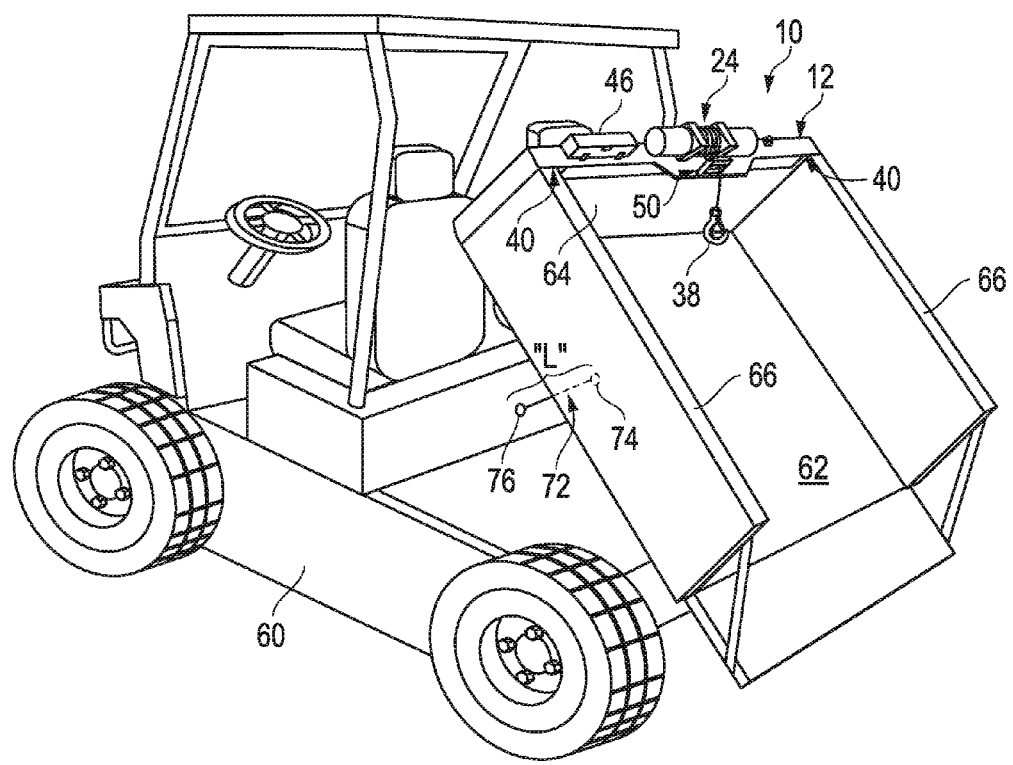
FIG. 3 is a perspective view of the invention of FIG. 1 attached to a UTV with a moveable bed in the up position.
Figure 4:
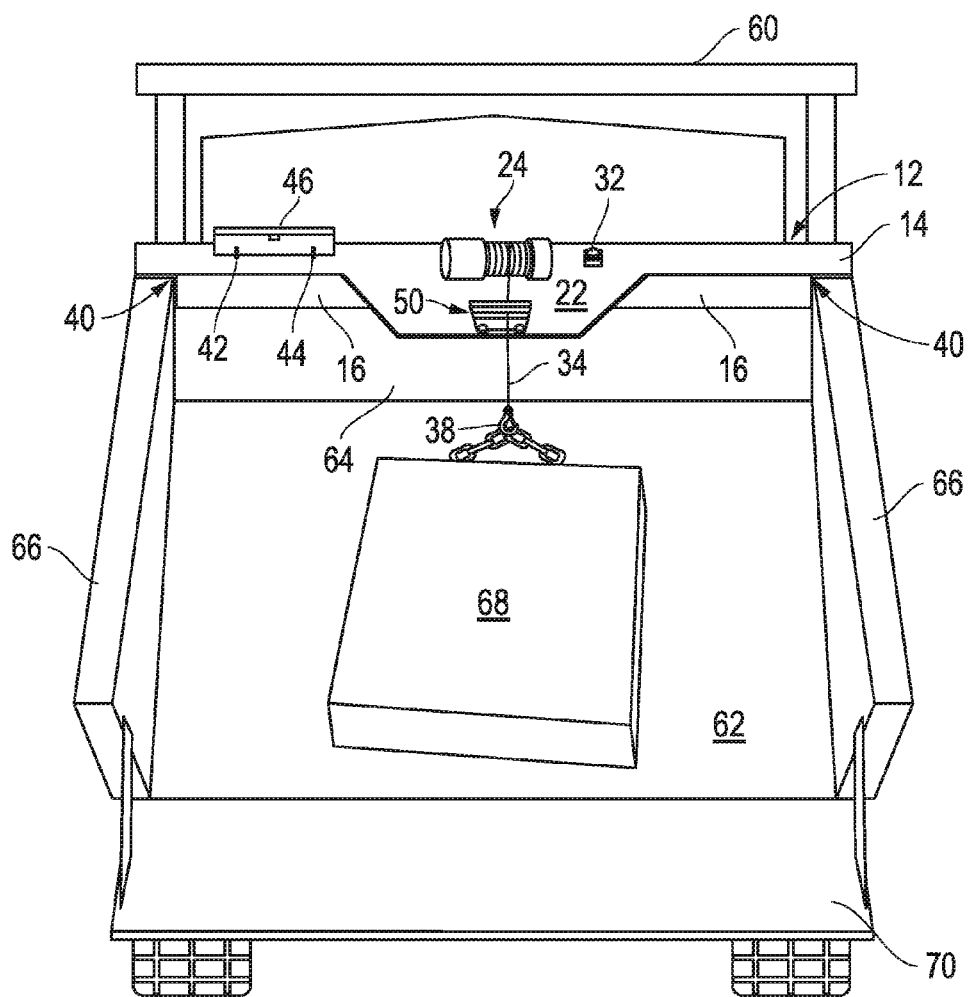
FIG. 4 is a rear view of the invention of FIG. 2 with an independent item drawn onto the bed by the winch system.

The top 14, front 16 and back 18 of opposite ends 20 preferably creates a generally U-shaped form as shown and in particular in any event is shaped so as to fit over and encapsulate the forward bed rail 64 of a vehicle 60 (not shown) as will be more fully described hereafter with reference to FIGS. 3 and 4.

In one aspect of the invention, back 18 includes a lock lip 19 as shown in FIG. 1. Lock lip 19 is formed to fit into the back of a forward bed rail 64 in a vehicle 60. The lock lip 19 is inserted into a pre-existing longitudinal slot (not shown) in the back of the forward bed rail 64 of many vehicles. This enhances the connection of the mount plate 12 as the mount plate 12 is rotated and fits over the top of forward bed rail 64.

Support platform 22 is located in between opposite ends 20 and is wider so as to provide a platform approximately in the center of the mount plate 12 for supporting and retaining winch assembly 24. Wedge supports 23 may be used underneath support platform 22 to aid in supporting the weight of winch assembly 24. Winch assembly 24 includes a motor 26 and reel 28 such that activation of the motor 26 operates the reel 28 in one rotational direction or the other. Power source 30 is connected with the winch assembly 24, motor 26. Power source 30 may be a separate, independent battery located underneath support platform 22 or may be the battery used by the vehicle itself (not shown) such that no additional battery is required.

Controller 32 is connected with winch assembly 24 and power source 30 such that power to the winch assembly 24 is controlled by operation of the controller 32. Controller 32 may be an "on-off" button as illustrated that is operated manually. Certainly the controller 32 may be operated remotely and wired or wirelessly as wireless operators are known in the art and may in certain circumstances, such as a single individual operating the winch system 10, be the desired option.

Preferably, winch assembly 24 includes a cable 34. Cable 34 includes one end (not shown) connected with reel 28 and an unattached free end 36. Free end 36 is unattached to reel 28 and preferably is attached to connector 38. Connector 38 preferably is a clip device as illustrated but may be any type of connector appropriate for the task of connecting the free end 36 of cable 34 to an independent item 68 (not shown, see FIG. 4).

Still referring to FIG. 1, cut out 40 in the front 16 of opposite ends 20 enables opposite ends 20 to fit over the top and back of the side rails 66 of a vehicle 60 as will be described more fully with regard to FIGS. 3 and 4 and as is illustrated in FIGS. 3 and 4. By means of cut out 40, however, Applicant has determined that a large amount of the stress of hauling an independent item 68 onto a vehicle 60 is transferred to the strong side rails 66 of a vehicle 60.

FIG. 1 also shows holder 42 and holder 44. Holders 42 and 44 are connected to the mount plate 12 at any desired location such that a device for retaining other desired items is provided. FIG. 1 shows an independent device 46 held in place on mount plate 12 by holders 42 and 44 in the form of clips. The back side of the clips, not shown, form a holder. Other types of holders 42 and 44 may satisfy this element of the invention as well, such as bolts, straps, etc. Independent device 46 may be a tool box containing machine tools, hunting tools, food, water, etc. all as desired by the user.

Further, FIG. 1 illustrates spacer 48. Spacer 48, when present, is connected to mount plate 12 support platform 22. As illustrated, winch assembly 24 is then connected to spacer 48 thereby elevating winch assembly 24 to a preferred position above cable guide 50. Cable 34 is contained within cable guide 50 so as to control movement of the cable 34 within the limits of cable guide 50.

Figure 2:
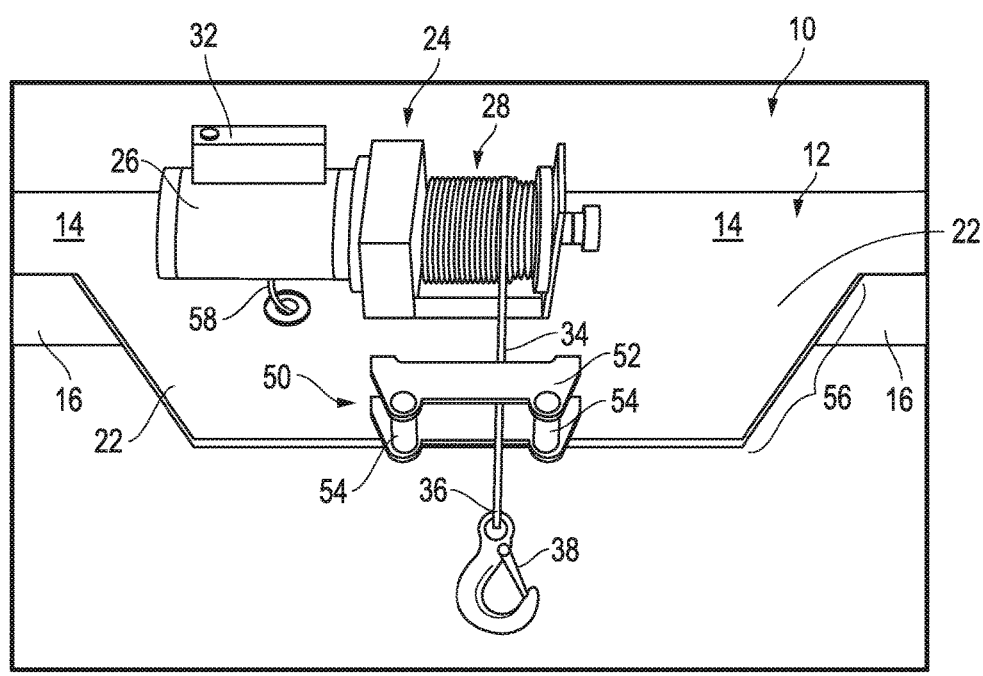
FIG. 2 is an enlarged front view of the invention of FIG. 1 showing the support platform, winch assembly, controller, cable, cable connector and cable guide in detail.

Referring to FIG. 2, details of cable guide 50 are made clear. Cable guide 50 includes, preferably, at least a top 52 and two guide posts 54 such that the cable 34 is captured between the top 52 and two guide posts 54 and the two guide posts 54 limit movement of the cable 34 from side to side between the guide posts 54. It should be noted that, preferably, cable guide 50 is located in front of winch assembly 24 on support platform 22. Further, preferably, support platform 22 has a top 14 and a back 18 but no front leg 16 and it includes an extended section 56 that extends out beyond the forward bed rail 64 of a vehicle 60 (not shown in FIGS. 1 and 2 but see FIGS. 3 and 4) and the cable guide 50 is attached to the support platform 22 at the front edge of extended section 56 as illustrated. Applicant has determined that the absence of a front leg 16 in this extended section 56 reduces the possibility of cable 34 snagging on it and reduces the weight of the winch system 10.

FIG. 2 shows a wire 58 from winch assembly 24, motor 26. Wire 58 connects with power source 30 (not shown) which may be the battery of the vehicle itself or a separate battery as described above.

FIG. 2 also shows an aspect of the invention where the controller 32 is connected to the winch assembly 24 instead of separately attached to support platform 22.

Referring now to FIGS. 3 and 4, the operation of winch system and method 10 is described in relation to vehicle 60. Vehicle 60 is illustrated in the form of an UTV but may be any vehicle 60 including a bed 62, forward rail 64, and two side rails 66. Bed 62 is a tilting bed shown in the raised position with winch system 10 attached to the forward rail 64 as described above. That is, the top 14, front 16 and back 18 of mount plate 12 form a U shape that fits over and encapsulates the forward rail 64. Importantly, cut out 40 enables the back 18 and top 14 to also engage the two side rails 66. As a result, once attached, by any known means such as bolts, stress from the winch system 10 is transferred to not just the forward rail 64 but also to the two side rails 66 which Applicant has determined very greatly increases the effectiveness and durability of the present invention by transferring much of the strain to the sides 66 of the vehicle 60 that resist buckling much better than just the forward rail 64 itself.

Still referring to FIG. 3, bed stop 72 with a length "L" and a first end 74 and a second end 76 is illustrated. In a vehicle 60 with a tilting bed 62, the bed stop first end 74 is connected to the underside of tilting bed 62 and the bed stop second end 76 is connected to the vehicle 60 such that the tilting bed 62 is prevented from tilting past the length "L" of the bed stop 62. Applicant has found that without the bed stop 72 the winch system 10 is so powerful that it can haul independent items 68 onto a bed 62 that are so heavy that they may cause the bed 62 to over rotate and break the tilting mechanisms (not shown) of the vehicle 60.

FIG. 4 shows connector 38 attached to independent item 68. Independent item 68 is any item the user wishes to load into, or off of, bed 62 of vehicle 60. Independent item 68 may be debris, logs, bales of hay, sacks of feed or the like. Hunters will use the winch system and method 10 to operate the winch assembly 24 to extend the cable 34 outside of the bed 62, for example. The connector 38 is attached to independent item 68, such as a deer carcass (not shown), and then the winch assembly 24 is operated in the opposite direction to haul the heavy, bulky, awkwardly shaped independent item 68 onto the bed 62. At that point, assuming bed 62 was raised, bed 62 is lowered and the rear gate 70 (if present as shown) is raised.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:
1. A winch system comprising:
(a) a mount plate with a length and a width wherein the length of said mount plate includes a top, front and back and wherein the width of said mount plate is generally uniform and smaller at opposite ends and wider in between the opposite ends such that a support platform is provided and wherein said front and back of said length are conformed to fit over and attach with a forward rail in a vehicle, wherein said vehicle also includes a side rail and where the side rail includes a top, a back, an outside face and an inside face, and wherein at, at least one of said opposite ends, said front includes a cut out such that said back and top of said mount plate captures the back and top of said side rail and the front abuts the inside face of said side rail of the vehicle;
(b) a winch assembly connected with said mount plate at said support platform;
(c) a power source connected with said winch assembly; and

(d) a controller connected with said winch assembly and said power source such that power to said winch assembly is controlled by operation of said controller.

2. The system of claim 1 wherein said winch assembly includes a cable with a first end connected with the winch assembly and a second end, wherein said second end includes a connector.

3. The system of claim 2 further including a cable guide wherein said cable is contained within said cable guide so as to control movement of said cable within the limits of said cable guide.

4. The system of claim 1 further including a locking lip on the back of the mount plate wherein said locking lip is conformed to fit into the forward rail of the vehicle and lock the mounting plate in place over the forward rail.

5. The system of claim 1 wherein said controller is wirelessly operable.

6. The system of claim 1 further including a holder connected with said mount plate.

7. The system of claim 1 further including a bed stop with a length and a first end and a second end wherein in a vehicle with a tilting bed said bed stop first end is connected to said tilting bed and the bed stop second end is connected to said vehicle such that said tilting bed is prevented from tilting past the length of the bed stop.

8. The system of claim 1 wherein said power source is selected from a group consisting of: a battery connected with said vehicle and a battery.

9. The system of claim 1 wherein said vehicle is a Utility Terrain Vehicle (UTV) with a forward rail and said mount plate fits over said forward bed rail and is attached to said UTV at said forward rail.

10. In an Utility Terrain Vehicle (UTV) with a forward rail and two side rails where the two side rails include a top, a back, an outside face and an inside face, a winch system comprising:
(a) a U-shaped mount plate with a length and a width wherein the length of said mount plate includes a top, front and back where said front and back form the legs of the U and wherein the width of the top of said U-shaped mount plate is generally uniform and smaller at opposite ends and wider in between the opposite ends such that a support platform is provided and wherein said U-shaped mount plate front and back of said length are conformed to fit over and attach with said UTV forward rail along said length and further wherein at said opposite ends said front legs include a cut out such that said back leg and top of said mount plate capture the back and top of said two side rails and the front leg abuts the inside face of said two side rails of the UTV;
(b) a winch assembly connected with said U-shaped mount plate at said support platform wherein said winch assembly includes a motor and a cable with a first end connected with said winch assembly and a second end, wherein said second end includes a connector conformed to removably connect with an independent item;
(c) a power source connected with said winch assembly motor;
(d) a controller connected with said winch assembly and said power source such that power to said winch assembly is controlled by operation of said controller; and
(e) a cable guide wherein said cable guide is attached to said support platform in front of said winch assembly and wherein said cable guide includes at least a top and two guide posts such that the cable is captured between said top and two guide posts and said two guide posts limit movement of said cable from side to side between said guide posts.

11. The system of claim 10 wherein said U-shaped mount plate support platform has a top and a back but no front leg and an extended section that extends out beyond the forward rail and said cable guide is attached to the support platform at said extended section.

12. The system of claim 10 wherein said controller is wirelessly operable.

13. The system of claim 10 further including a holder connected with said U-shaped mount plate.

14. The system of claim 13 wherein said holder is conformed to connect with an independent device.

15. The system of claim 10 further including a locking lip on the back of the mount plate wherein said locking lip is conformed to fit into the forward rail of the vehicle and lock the mounting plate in place over the forward rail.

16. The system of claim 10 further including a bed stop with a length and a first end and a second end wherein in an UTV with a tilting bed said bed stop first end is connected to said tilting bed and the bed stop second end is connected to said UTV vehicle such that said tilting bed is prevented from tilting past the length of the bed stop.

17. In an Utility Terrain Vehicle (UTV) with a forward rail and two side rails where the two side rails include a top, a back, an outside face and an inside face, a winch method comprising:
(a) providing a U-shaped mount plate with a length and a width wherein the length of said mount plate includes a top, front and back where said front and back form the legs of the U and wherein the width of said U-shaped mount plate is generally uniform and smaller at opposite ends and wider in between the opposite ends such that a support platform is provided and wherein said U-shaped mount plate front and back of said length is conformed to fit over and attach with said UTV forward rail along said length and further wherein at said opposite ends said front legs include a cut out such that said back leg and top of said mount plate capture the back and top of said two side rails and the front leg abuts the inside face of said two side rails of the UTV; a winch assembly connected with said U-shaped mount plate at said support platform wherein said winch assembly includes a motor and a cable with a first end connected with said winch assembly and a second end, wherein said second end includes a connector conformed to removably connect with an independent item; a power source connected with said winch assembly motor, a controller connected with said winch assembly and said power source such that power to said winch assembly is controlled by operation of said controller, and a cable guide wherein said cable guide is attached to said support platform in front of said winch assembly and wherein said cable guide includes at least a top and two guide posts such that the cable is captured between said top and two guide posts and said two guide posts limit movement of said cable from side to side between said guide posts; and
(b) operating said controller to provide power to said winch motor.

18. The method of claim 17 wherein upon operation of said winch motor said cable connector is extended and attached to said independent item.

19. The method of claim 18 wherein said independent item is located outside of said UTV.

20. The method of claim 19 wherein upon continued operation of said winch motor said independent item is drawn toward said forward bed rail and onto said UTV.

\* \* \* \* \*